(No Model.)

A. B. ROBINSON.
HORSE COLLAR FASTENING.

No. 258,677. Patented May 30, 1882.

WITNESSES
J. L. Ourand
L. L. Miller

INVENTOR
Alfred B. Robinson,
per Chas. H. Fowler,
Attorney

UNITED STATES PATENT OFFICE.

ALFRED B. ROBINSON, OF LEBANON, MISSOURI.

HORSE-COLLAR FASTENING.

SPECIFICATION forming part of Letters Patent No. 258,677, dated May 30, 1882.

Application filed March 27, 1882. (No model.)

*To all whom it may concern:*

Be it known that I, ALFRED B. ROBINSON, a citizen of the United States, residing at Lebanon, in the county of Laclede and State of Missouri, have invented certain new and useful Improvements in Horse-Collar Fastenings; and I do hereby declare that the following is a full, clear, and exact description of the same, reference being had to the annexed drawings, making a part of this specification, and to the letters and figures of reference marked thereon.

Figure 1:
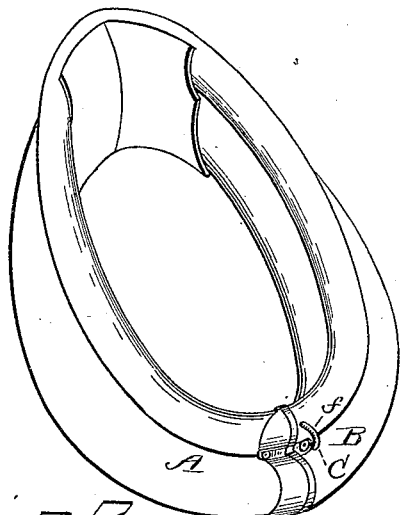
Figure 2:
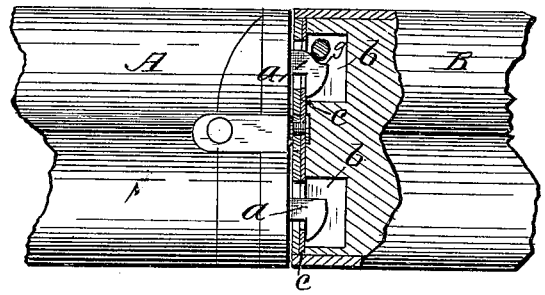
Figure 3:
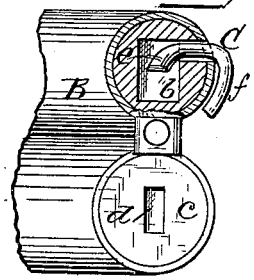
Figure 4:
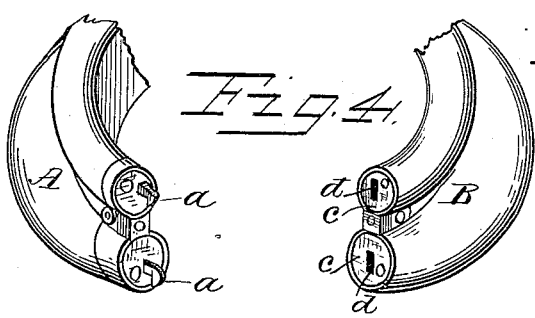
Figure 5:

Figure 1 of the drawings is a perspective view of a horse-collar embodying my invention. Fig. 2 is a detail view, showing the two ends of the collar fastened together, one of the ends being partly in section; Fig. 3, a front elevation of one of the ends of the collar. Fig. 4 is a perspective view of the two ends or sections of the collar disconnected from each other, and Fig. 5 a detail view of the fastening device.

The present invention has relation to certain new and useful improvements in horse-collar fastenings, and has for its object to provide a simple and effective device for connecting together the free ends of the collar and admit of their being easily and readily disconnected from each other as circumstances require.

These objects I attain by the construction substantially as shown in the drawings and hereinafter described.

In the accompanying drawings, A B represent the free ends of a horse-collar of the usual construction, to the end A of which is secured in any suitable manner shouldered tongues $a$, adapted to enter recesses $b$ in the opposite end, B, of said collar. Over the recesses $b$ are secured caps $c$ of any suitable material, the same having elongated openings $d$ to correspond with the greatest width of the shouldered tongues $a$, so that they can pass through the openings or be withdrawn therefrom in connecting or disconnecting the ends A B as required.

To retain the shouldered tongues $a$ within the recesses $b$ a locking or fastening device is employed consisting of a metal rod, C, which passes through a hole in the collar. This rod C is of peculiar form, the end coming within the recess $b$ being bent at an angle, as shown at $e$, and its end extending outside the collar being curved to conform with the convexity or curve in said collar, as shown at $f$. The object of the curve $f$ is to have the rod lie against the outer surface of the collar when brought to the position required for fastening or retaining the shouldered tongues $a$ within the recesses $b$. This will enable the hame-strap of the harness when connected to the collar or passing around the same to cover or extend over the curved end of the rod C, and thus prevent it from turning when the hames are fastened, thereby preventing the accidental unfastening of the collar. The curved end $e$, when brought in position, as shown in Figs. 2 and 3, will bear against a seat, $g$, upon the rear edge of one of the shouldered tongues $a$, which prevent the latter from being brought laterally on a line with the openings $d$ in the caps $c$. That portion of the caps $c$ extending over the openings or recesses $b$ forms a bearing, against which the shoulders of the tongues come in contact, and which prevents them from being withdrawn until brought on a line with the elongated openings $d$. By turning the rod C so as to bring its curved end $e$ at a right angle to the position held in Fig. 3 it will admit of the tongues $a$ being moved laterally to bring them in line with the elongated openings, when they may be readily withdrawn. It is only necessary that one rod C be used, as by locking one of the tongues $a$ the other will be locked also. The caps $c$ may, if desired, be made of metal or other suitable material in one piece, in shape to cover the entire end of the collar, of course having the openings $d$ cut in them, as shown.

The collar may be of any of the usual forms without affecting the means shown and described of fastening the ends together.

The fastening as shown is not only very simple and easily operated, but forms a secure and positive means of locking the free ends of the collar together at the breast or under side, and with facility enabling the ends to be detached or disconnected. The peculiar curve of the outer end of the rod C enables the hame-strap to pass over and bear upon it to prevent the rod from turning.

Having now fully described my invention, what I claim as new, and desire to secure by Letters Patent, is—

In a horse-collar, the combination, with the end A, having shouldered tongues $a$, of the end B, having recesses $b$, caps $c$, formed with elongated openings $d$, and the rod C, having curved end $e$, and constructed to operate substantially as and for the purpose set forth.

In testimony that I claim the above I have hereunto subscribed my name in the presence of two witnesses.

ALFRED B. ROBINSON.

Witnesses:
W. I. WALLACE,
E. B. KELLERMAN.